Nov 24, 1953    J. M. RICHARDS    2,660,664
SEARCH SIGNAL APPARATUS FOR DETERMINING THE LISTENING
HABITS OF WAVE SIGNAL RECEIVER USERS
Filed Oct. 24, 1947    3 Sheets-Sheet 1
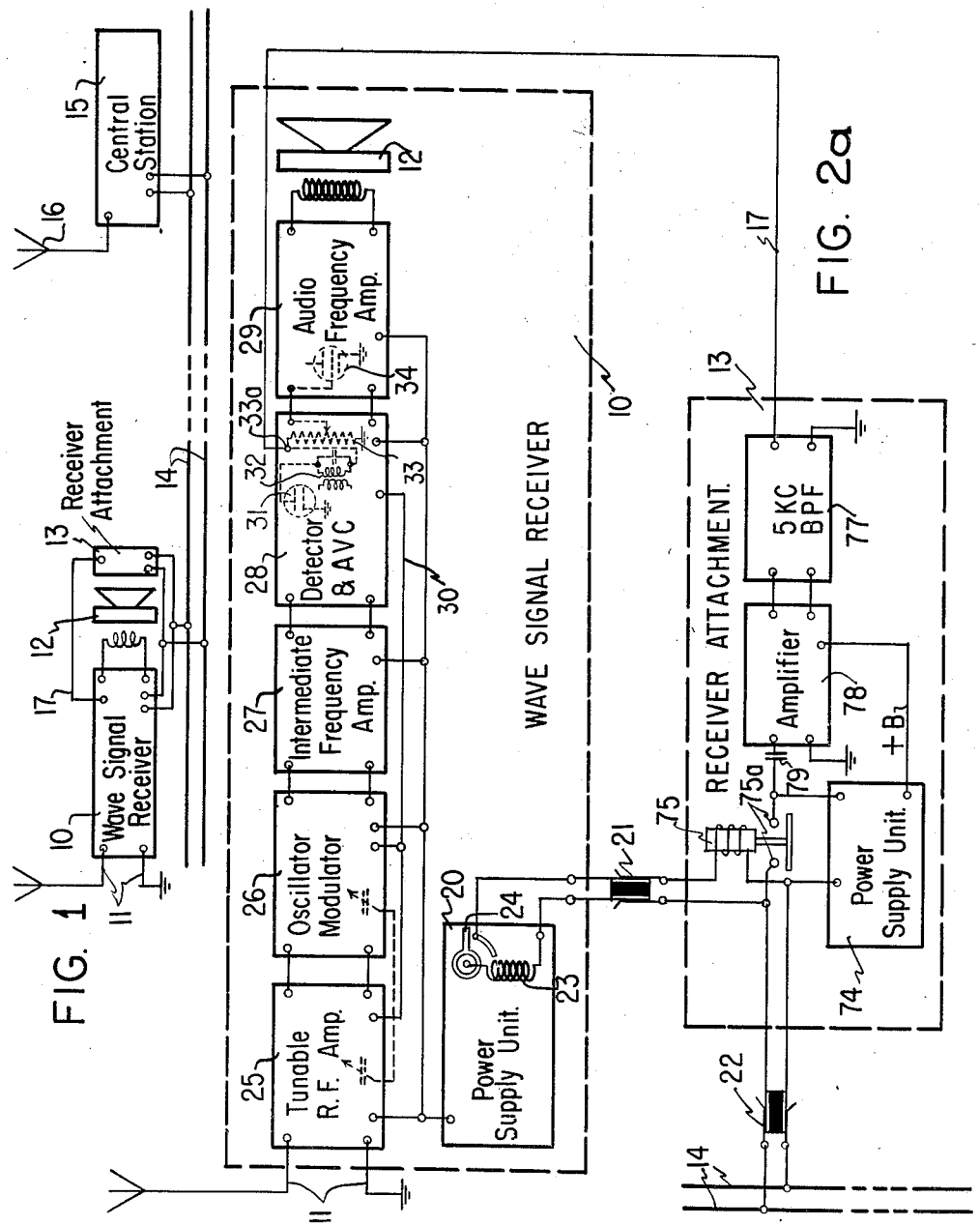
INVENTOR.
Joseph M. Richards
BY
Richard D Mason
Attorney

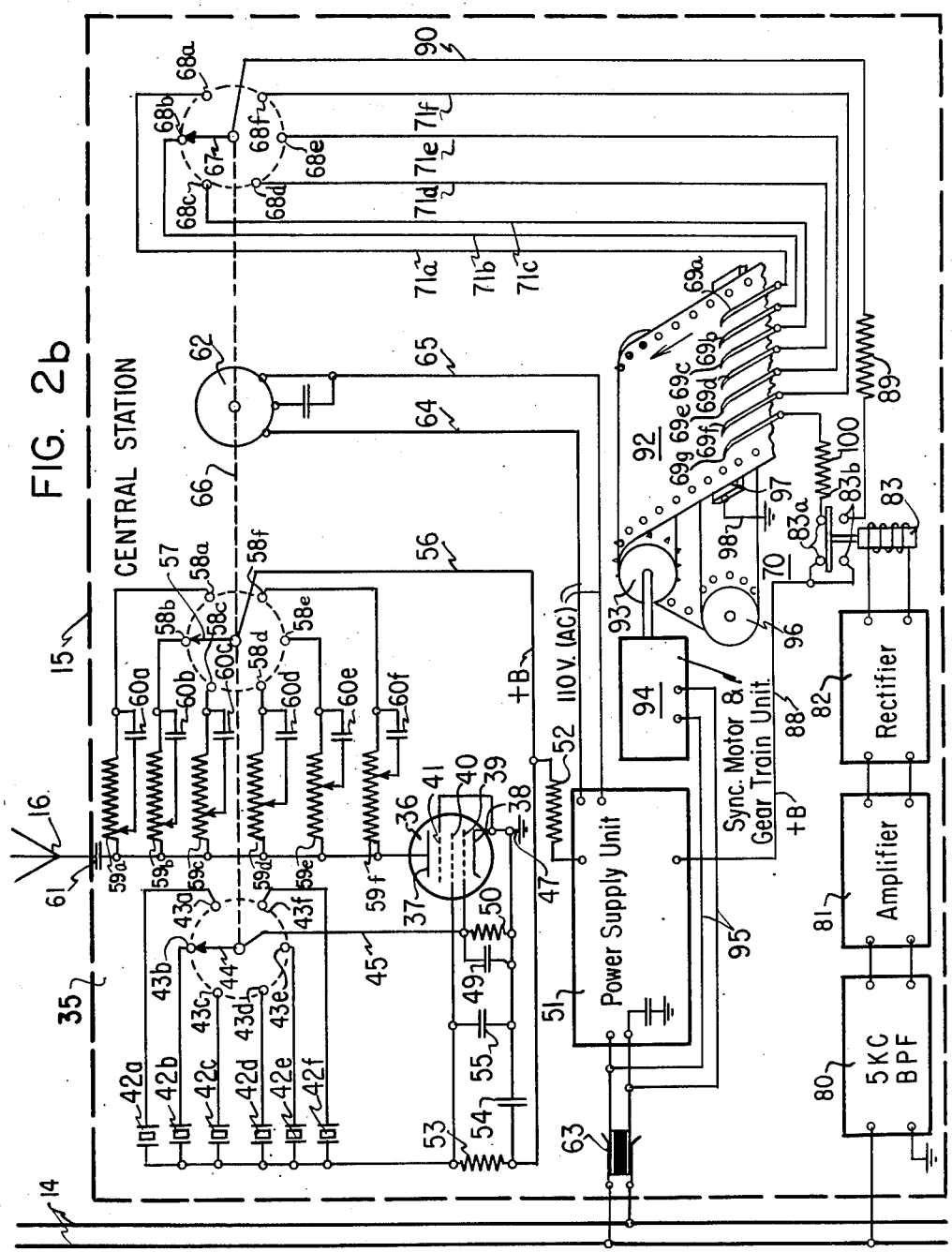

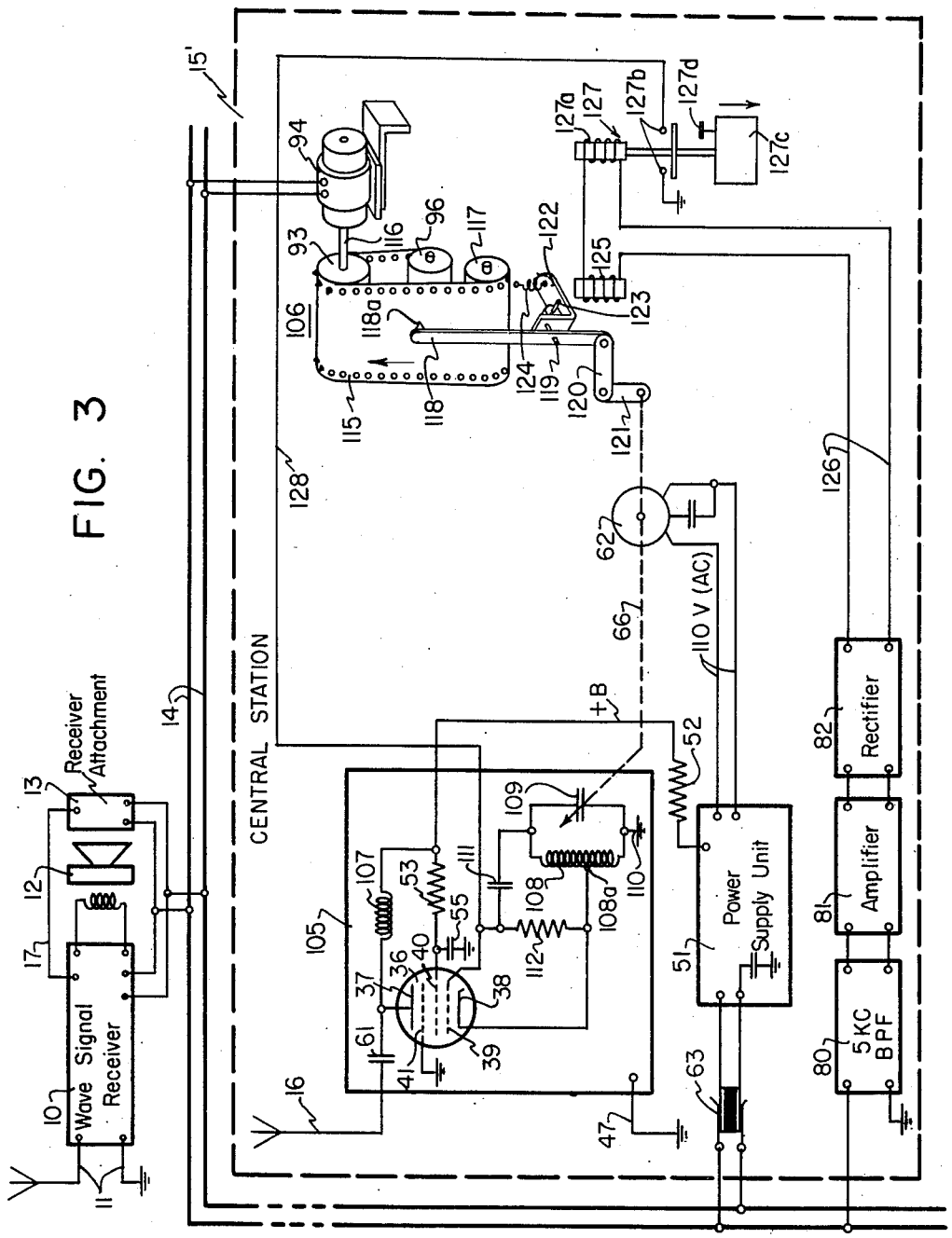

Patented Nov. 24, 1953

2,660,664

UNITED STATES PATENT OFFICE 2,660,664

SEARCH SIGNAL APPARATUS FOR DETERMINING THE LISTENING HABITS OF WAVE SIGNAL RECEIVER USERS

Joseph M. Richards, Tulsa, Okla., assignor to A. C. Nielsen Company, Chicago, Ill., a corporation of Illinois Application October 24, 1947, Serial No. 781,786

9 Claims. (Cl. 250—2)

1

The present invention relates to a search signal type of apparatus for determining the listening habits of wave signal receiver users. More particularly the present invention is concerned with such an apparatus for recording the listening habits of wave signal receiver users comprising a search signal generator the output of which causes no annoying squeal in the wave signal receiver being metered or monitored. Specifically the present invention is an improvement on the arrangements disclosed and claimed in the co-pending Scherbatskoy application, Serial No. 781,988, filed concurrently herewith and assigned to the same assignee as the present application.

In the above mentioned Scherbatskoy application there are disclosed and claimed various arrangements of the so-called search signal type of apparatus for recording the listening habits of wave signal receiver users, whereby with instrumented methods a continuous record of the transmitting station to which a wave signal receiver is tuned may be made and from which it is readily possible to analyze the listening habits of the users of such wave signal receiver. In such instrumented methods of determining the listening habits of wave signal receiver users the receivers in a large number of homes are metered or monitored to afford the basic information from which the analysis can be made. From this basic information a statistical analysis of the various factors affecting the sales effectiveness of particular programs may accordingly be arrived at. In such a system employing apparatus for recording the listening habits of wave signal receiver users it is contemplated that the selection of the system collaborator homes—that is, the homes in which wave signal receiver use is to be logged—shall be on a basis such that all of the various factors affecting any process of sampling public opinion such, for example, as the number of potential listeners, religion, economic affluence, etc., are accounted for on a weighted basis.

In the search signal type of apparatus for recording the listening habits of wave signal receiver users disclosed in the above mentioned copending application a search signal generator is employed which cyclically, as, for example, once per minute, scans the frequency spectrum by sending out a search signal which (continuously or discontinuously) varies in frequency during each scanning cycle. The search signal has a composition such that when the search signal "frequency" has a predetermined relationship to the frequency of the transmitter to which the wave signal receiver being logged is tuned a response is produced in the wave signal receiver. Usually the search signal is modulated by an audio frequency signal having only a single component. For reasons set forth in the above mentioned Scherbatskoy application the frequency of the audio frequency signal is preferably of the order of 5 or 6 kc. A response produced in the receiver by the detection of the modulated search signal is indicative of the fact that the "frequency" of the search signal corresponds to the tuning of the wave signal receiver, the instant of occurrence of the response during the scanning cycle being indicative of the particular tuning condition of the wave signal receiver. By employing a single frequency modulating signal it is possible to make the response so low as to be inaudible and yet with sufficient filtering and amplification the response is capable of being measured without difficulty. A desirable characteristic of the response (or search tone as it might be called) is a very high ratio of measurability to audibility.

During the scanning cycle when the frequency of the search signal approaches and passes beyond the frequency of the station carrier to which the wave signal receiver is tuned there is a tendency to produce an audible heterodyne squeal. In the above mentioned co-pending application there are disclosed and claimed various means for producing a search signal which is substantially incapable of producing a heterodyne note due to intermodulation between the station carrier and search signal. Arrangements are also disclosed for rendering the heterodyne note substantially non-disturbing.

In all of the prior art search signal type of apparatus for recording the listening habits of wave signal receiver users it was necessary to provide modulation of the search signal in order to produce a response in the receiver output. It would be desirable to provide an arrangement in which no modulation need be provided for the search signal and yet wherein a response (or search tone) is produced in the receiver output. It would furthermore be desirable to provide an arrangement whereby the production of objectionable squeals is avoided.

Accordingly it is an object of the present invention to provide a search signal type of apparatus for recording the listening habits of wave signal receiver users in which no objectionable squeals occur and furthermore which requires no modulation component of the search signal.

It is another object of the present invention to provide a new and improved search signal generator which automatically is capable of producing a search tone response in the wave signal receiver being monitored.

It is a further object of the present invention to provide a search signal type generator for monitoring a wave signal receiver with means to produce rigorous frequency control of the search signal so that no objectionable heterodyne note in the wave signal receiver being monitored is produced.

Still another object of the present invention is to provide a search signal type apparatus for recording the listening habits of wave signal receiver users in which the frequency of the search signal varies in a stepwise manner, the frequency at each step differing by substantially the same audible frequency from the frequency of a transmitter to which the wave signal receiver is likely to be tuned.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is a block diagram of a search signal type of apparatus for recoring the listening habits of wave signal receiver users embodying the present invention for "metering" or "monitoring" any type of wave signal receiver;

Figs. 2a and 2b are diagrammatic illustrations showing first and second portions of the details of the system of Fig. 1, arranged so as to be united in a single disclosure in the manner of Fig. 1; and Fig. 3 is a diagrammatic illustration showing a modification of the present invention.

In accordance with one embodiment of the present invention there is provided a search signal type of apparatus for metering or monitoring a wave signal receiver to produce a record with respect to time of the tuning condition of such receiver. The search signal generator comprises means for producing a signal varying in frequency in a series of successively occurring steps, each step comprising a discrete frequency differing from the frequency of an associated transmitting station to which the wave signal receiver is likely to be tuned by a frequency capable of producing a response or a search tone in the wave signal receiver. Because of the usual selectivity of conventional wave signal receivers and also because of the limitations in the frequency characteristic of the audio amplifier and associated apparatus the above mentioned difference in frequency is preferably of the order 5 kc. Thus, when the receiver is tuned to a station carrier the associated search signal will also be received and will intermodulate in the receiver second detector (in the case of the superheterodyne receiver) or in the receiver detector (in the case of a TRF receiver). This intermodulation causes a heterodyne note having a frequency equal to the difference between the two receiver carriers (i. e. the station carrier and the search signal carrier.) This heterodyne note appears in the audio section of the wave signal receiver as a single frequency (5 kc. tone) hereinafter referred to as the search tone. (This heterodyne note should be differentiated from the disturbing squeals and heterodynes referred to previously in this application because it does not have the characteristics of a squeal, i. e. the usual objectionable heterodyne squeal occurs when one continuously varying frequency or unstabilizing varying frequency intermodulates with another, thus causing a heterodyne note which varies in pitch so as to occupy a substantial portion of the audible spectrum. It has been found that such heterodyne notes are extremely objectionable and have a very high audibiilty. Furthermore, it has been found that because the pitch of the note is not constant it has a poor measurability because it cannot be separated from other signals by means of simple filters.) In the illustrated arrangement of this invention the search signal frequency is stabilized by means of a piezoelectric crystal and the heterodyne note therefore does not vary erratically but has a fixed frequency of exactly 5 kc. This single frequency is not particularly objectionable, first because many loudspeakers do not respond efficiently in that region and secondly because the ear also has somewhat reduced sensitivity. At that frequency, furthermore, the 5 kc. note can be picked up by a very selective filter even when the intensity is very low. The search signal generator operates to produce the search signal of stepwise varying frequencies during a scanning cycle preferably having a period of one minute. At the instant during the search signal cycle that the frequency of the carrier tuned in by the wave signal receiver differs from the frequency of the associated frequency step of the search signal by a frequency capable of producing a response, such response is produced and the instant during the cycle of the search signal that this response is produced is indicative of the particular transmitting station to which the wave signal receiver is tuned. A continuous record of the response produced in the receiver provides a continuous record of the tuning condition of the wave signal receiver.

Referring now to Fig. 1 of the drawings, there is illustrated a wave signal receiver 10 to be metered by the apparatus for recording the listening habits of wave signal receiver users of the present invention. This wave signal receiver 10 may be any type of wave signal receiver and need not be the well-known superheterodyne type of receiver as was the case with many prior art types of apparatus for recording the listening habits of wave signal receiver users. The wave signal receiver 10 is illustrated as comprising an antenna ground circuit 11 and a signal reproducer or loud speaker 12. Associated with the wave signal receiver 10 is a portion of the apparatus for recording the listening habits of wave signal receiver users which might be referred to as the receiver attachment 13. This receiver attachment is a relatively simple apparatus of relatively small bulk which is generally capable of being disposed within the available space in or on even the smallest receiver cabinet. The receiver attachment 13 and the receiver 10 are connected to a power supply source such as the house wiring circuit 14 in a manner understood by those skilled in the art. The house wiring circuit 14 provides a source of power for the receiver and also provides a channel whereby the receiver response which is converted into a transmittable signal by the receiver attachment 13 can be transmitted to a central station generally designated at 15 and located in any suitable place preferably remote from the wave signal receiver 10. The central station 15 includes the precision apparatus which may be of substantial bulk for generating the search signal and also for recording the receiver response as described hereinafter. Preferably the central station is disposed in the basement or any other out-of-the-way place such as a closet of the home in which the wave signal receiver being monitored or metered is located. The central station 15 includes a suitable transmitting antenna 16 whereby the search signal is transmitted so that it is capable of being received by the antenna-ground circuit 11 of the wave signal receiver 10. The house wiring circuit 14 is illustrated as comprising a dotted line section thereby indicating the remote relationship of the receiver 10 and the central station 15. It should be understood that where conditions warrant the central station 15 may be positioned closely adjacent to the wave signal receiver 10. It is immaterial as far as the present invention is concerned whether the central station is positioned close to or remote from the wave signal receiver 10. The remote relationship is illustrated in the drawings since it presents the most usual situation.

For the purpose of picking out the search tone or response produced in the receiver 10 by virtue of receiving the search signal, the receiver attachment 13 is illustrated as being connected to the audio circuit of the wave signal receiver 10, preferably ahead of any tone or volume control by means of a conductor 17. As is disclosed in the above mentioned co-pending Scherbatskoy application such a connection to the receiver 10 is very simple, and in no way requires disturbing the high frequency tuning circuits of the receiver. Also as is disclosed in the above mentioned Scherbatskoy application such connection with the receiver may be completely dispensed with if desired. It will be apparent that with such an arrangement little or no resistance will be encountered from the collaborator with regard to obtaining permission for placing such an apparatus for recording the listening habits of wave signal receiver users in the collaborator's home. The receiver attachment 13 is of such small bulk that in many cases it may comprise a volume no greater than that of an ordinary cigarette package and obviously if no attachment whatever is made with the receiver the collaborator can have no fear that the operation of his receiver will be impaired. In addition as was brought out above the more bulky precision apparatus is located in an out-of-the-way place in the home with no connections to the receiver or receiver attachment except by way of the already present house wiring circuit which is assumed to extend throughout the home and consequently will extend from the receiver and receiver attachment to the central station.

Referring now to Fig. 2a of the drawings it will be noted that the details of the wave signal receiver 10 and the receiver attachment 13 are shown although the particular construction of the wave signal receiver 10 forms no part of the present invention. For the purpose of making a complete disclosure the wave signal receiver 10 is depicted as of the well-known superheterodyne type although it might equally well comprise some other type of receiver. As illustrated the wave signal receiver 10 comprises a power supply unit 20 which is connected to the house wiring circuit 14 through a plug connector 21, the receiver attachment 13 to be described hereinafter, and the plug connector 22. One type of power supply unit is illustrated as including a primary winding 23 of a power supply transformer which is connected across the house wiring circuit 14 as is clearly indicated in the drawings through a manually operable switch 24. It will be understood that the switch 24 is preferably the standard form of switch employed in radio receivers which usually is combined with the manual volume control. With the arrangement disclosed it is apparent that the plug connector of the wave signal receiver 10 instead of being connected to a conventional outlet is connected to such an outlet in the receiver attachment comprising a part of the plug connector 21 and the receiver attachment 13 on the other hand is connected to the conventional wall outlet associated with the house wiring circuit 14 by means of the plug connector 22.

In addition to the power supply unit 20 the wave signal receiver 10 comprises a tunable radio frequency amplifier unit 25, an oscillator modulator unit 26, an intermediate frequency amplifier unit 27, a detector and automatic gain control unit 28, and an audio frequency amplifier 29 all connected in cascade in the order named. The antenna ground circuit 11 is connected to the input of the tunable radio frequency amplifier 25 while the signal reproducer or loud speaker 12 is connected to the output of the audio frequency amplifier 29. The power supply unit 20 is illustrated as being connected with the various stages of the wave signal receiver 10 for supplying the necessary plate voltage as well as filament current. The detector and automatic gain control unit 28 is illustrated as being connected with several of the preceding stages by a circuit designated as 30 which forms a part of the automatic volume control circuit. The detector and automatic gain control unit 28 is illustrated as including a detector tube 31. Connected in series in the plate circuit of this detector tube 31 is one winding 32 of a suitable coupling transformer for coupling the tube 31 to the preceding stages, and an automatic volume control resistor 33. The resistor 33 has a terminal 33a which is the high potential end or radio frequency end of the volume control, often referred to as the "top of the volume control resistor." It should be understood that this terminal 33a is readily available in most wave signal receivers such as 10 without in any way disturbing the electrical circuits therein. The volume control resistor 33 has a variable tap thereon connected to the control electrode of an electron tube 34 which may comprise the first audio stage of the wave signal receiver 10.

The operation of the wave signal receiver 10 described above will be apparent to those skilled in the art. Briefly radio frequency signals are selected and amplified by the tunable radio frequency amplifier 25. These selected signals are supplied to the oscillator modulator unit 26 where they are converted to a fixed intermediate frequency signal which is amplified in the intermediate frequency amplifier 27 and subsequently detected in the detector stage 28. The detected modulation signals of audio frequency appearing at the output of the detector stage 28 are amplified by the audio frequency amplifier 29 and reproduced in audible form by the signal reproducer or loud speaker 12.

Before considering the details of the receiver attachment designated at 13 in Fig. 2a of the drawings, the purpose of which is to convert a suitable response or search tone in the wave signal receiver 10 to a measurable signal which can be transmitted to the recording unit in the central station 15, reference may first be had to Fig. 2b of the drawings wherein is disclosed a portion of the apparatus of the central station 15 and specifically the so-called "side frequency" search signal generator of the present invention designated generally by the reference numeral 35. In accordance with the present invention the search signal generator 35 is capable of producing during each scanning cycle a search signal the frequency of which varies in a series of discrete frequency steps with the frequency at each step differing by an exact audible frequency from that of an associated transmitter capable of being tuned in by a wave signal receiver 10. In other words the search signal comprises frequency steps which are different from the frequencies of transmitting stations likely to be tuned in by the receiver 10 and hence the term "side frequency." The difference frequency between any step of the search signal and an associated carrier signal likely to be received by a wave signal receiver 10 is arranged to be constant for all transmitting stations and furthermore is an audible frequency. It is a well-known fact that in the standard broadcast band, for example, covering a range of frequencies from 540 to 1600 kc. that the frequencies assigned to transmitting stations broadcasting within that frequency range must be spaced by frequency increments of 10 kc. By that is meant that the transmitting frequency (expressed in kilocycles) of any transmitting station within the United States broadcasting within the frequency range of the standard broadcast band ends in a zero. In accordance with the present invention therefore the frequencies of the steps of the search signal generator are positioned so as to differ from the frequencies of corresponding transmitting stations by exactly 5 kc. Such a difference frequency produces a 5 kc. response within the receiver without the requirement of a 5 kc. modulation superimposed on the search signal. Also as was brought out in the above mentioned Scherbatskoy co-pending application a frequency of 5 kc. is within the audible range of both the wave signal receiver and the human ear and desirably at the less sensitive portion of the audible range. Furthermore by choosing 5 kc. which is actually half way between transmitting stations which are always separated by 10 kc. in the standard broadcast band, a 5 kc. response can be produced in the receiver when the search signal is intermodulated with the carrier frequency of a station which is either 5 kc. higher in frequency or 5 kc. lower in frequency. Consequently if crystal oscillators are employed which are satisfactory for producing a rigorous frequency control, the number of crystals required when employing a frequency difference of exactly 5 kc. as described above is substantially reduced since the same crystal may be employed to monitor either a station 5 kc. above or 5 kc. below the frequency of the crystal.

Referring now to the details of the search signal generator 35, it may be noted that as illustrated in the drawings it comprises an electron tube 36 which is specifically illustrated as a pentode having an anode 37, a cathode 38, a control electrode 39, a screen grid 40 and a suppressor grid 41. For the purpose of producing a variable frequency search signal the frequency of which varies in a stepwise manner the pentode 36 is operated as a crystal oscillator of the Pierce type with the discrete frequency steps accurately controlled by a plurality of crystals designated as 42a, 42b, 42c, 42d, 42e, and 42f which are arranged to be successively connected once during each scanning cycle into the oscillator circuit including the pentode 36. As mentioned above each of the crystals 42a, 42b, 42c, 42d, 42e, and 42f is chosen to have a frequency which differs by an exact predetermined frequency from the frequency of one of a plurality of transmitting stations likely to be tuned in by the wave signal receiver 10. It will be understood that for different localities different crystals will be chosen. For the standard broadcast band the crystal 42a preferably has a natural frequency differing by exactly 5 kc. (either above or below) from a transmitting station having a transmitting frequency within the range of 540 to 1600 kc. Preferably the crystal 42a has the lowest natural frequency and the other crystals are of progressively higher frequencies, each differing by exactly 5 kc. from the frequency of an associated transmitting station likely to be tuned in by the wave signal receiver 10. It will be understood that a difference frequency of 5 kc. will be produced whenever a signal produced by the crystal oscillator which is either 5 kc. higher or 5 kc. lower in frequency than that of a transmitting station tuned in by the receiver 10 is intermodulated with the transmitting frequency of said transmitting station. Although only six such crystals are illustrated in the drawings it should be understood that any desired number may be employed depending upon the number of transmitters to which the wave signal receiver 10 is likely to be tuned. The six crystals are illustrated by way of example only and the specific number chosen is unimportant as far as the present invention is concerned. It will be understood that by employing crystals which differ by 5 kc. from the frequencies of transmitting stations likely to be tuned in by wave signal receivers being monitored, that the number of crystals having different natural frequencies which must be available is less than would be the case if the crystals were chosen to have frequencies which did not differ by 5 kc. from the transmitting frequencies of broadcasting stations.

For the purpose of selectively connecting one crystal at a time into the oscillator circuit comprising the pentode 36, the crystals 42a to 42f inclusive have a common terminal which is connected to the screen grid 40 of the pentode 36. The other terminals of the crystals 42a, 42b, 42c, 42d, 42e, and 42f are each connected to a different one of a plurality of contacts 43a, 43b, 43c, 43d, 43e, and 43f respectively which are arranged along the periphery of a circle in equally spaced relationship so as to form with a rotatable switch arm 44 a rotating switch mechanism. As will be brought out hereinafter the rotating switch arm 44 is preferably adapted to be driven at a constant angular speed preferably of one R. P. M. so that the terminals or contacts 43a to 43f are successively engaged in that order at equally spaced time intervals.

In order that the crystals 42a to 42f are connected accurately to control the stepwise varying frequency of the search signal, the movable switch arm 44 is connected by means of a conductor 45 to the control electrode 39 of the pentode 36. The cathode 38 of the pentode 36 is preferably grounded as indicated at 47 and a suitable feed back capacitor 49 and a grid leak resistor 50 are provided. The suppressor grid 41 is connected to the cathode as is clearly indicated and the screen grid 40 is furthermore connected to a source of +B potential such as an output of the power supply unit 51 through voltage dropping resistors 52 and 53. A suitable radio frequency by-pass condenser 54 is also provided. With this arrangement there are produced radio frequency oscillations with the cathode 38, the grid 39, and the screen grid 40 acting as a triode, electron coupled to the plate circuit of the tube 36 in conventional fashion.

To supply the search signal varying in frequency in a stepwise fashion appearing in the plate circuit of the pentode 36 to the transmitting antenna 16 so that it can be transmitted to the wave signal receiver 10 for reception by the antenna ground circuit 11, the plate circuit of the electron tube 36 is connected to the source of +B potential at the terminal of the voltage dropping resistor 52 through a conductor 55, a plurality of parallel connected networks, and a rotatable antenna attenuator switch comprising the movable arm 57 and a plurality of contacts 58a, 58b, 58c, 58d, 58e, and 58f arranged in equally spaced relationship around the periphery of a circle. As illustrated the contacts 58a to 58f are positioned in exactly the same manner as the contacts 43a to 43f and the contacts marked with the corresponding letter are simultaneously engaged by the associated rotatable arms 57 and 44 respectively. Each of the parallel connected networks comprises a resistor 59 specifically designated as 59a, 59b, 59c, 59d, 59e and 59f respectively for the different networks and a capacitor 60 specifically designated as 60a, 60b, 60c, 60d, 60e and 60f respectively for the various networks. Each capacitor 60 is adapted to parallel a variable portion of its associated resistor 59. The resistors 59 are provided to insure that the direct current plate voltage remains constant at all times so as not to cause possible variations in the output frequency of the oscillator. However, for the purpose of producing the desired attenuation of the alternating current signals of discrete frequencies produced by virtue of the plurality of crystals 42a to 42f, the variable impedance paths through the capacitors 60 and the variable portions of the resistors 59 are provided. With this arrangement a specific intensity of the search signal for each frequency can be provided. This is necessary because the search signal for each associated station must have an intensity approximately equal to that of the station signal. The antenna 16 is coupled to the plate circuit of the pentode 36 by means of a suitable coupling capacitor 61.

To produce a variable frequency search signal which comprises a plurality of discrete steps, each step occurring once during each search or scanning cycle and at exactly the same position during each cycle, there is provided a synchronous motor and gear train unit 62 which is adapted to be connected with the house wiring circuit 14 through the power supply unit 51 which is illustrated as being connected to the house wiring circuit through the plug connector 63. The output of the power supply unit connected to the motor 62 is preferably 110 volts alternating current and the conductors 64 and 65 are illustrated as leading from the power supply unit 51 to the synchronous motor 62. Preferably the synchronous motor 62 is adapted to rotate the switch arms 44 and 57, by means of an interconnecting shaft generally designated at 66 at one R. P. M. This shaft 66 is also adapted to rotate a third switch arm 67 which with the contacts 68a, 68b, 68c, 68e and 68f, provides a stylus selecting switch with reference to a plurality of styli 69 forming a part of a recorder unit 70. As illustrated the terminals or contacts 68a to 68f inclusive of the stylus selecting switch are adapted to be connected by suitable conductors 71 specifically designated as 71a, 71b, 71c, 71d, 71e, and 71f with the styli 69a, 69b, 69c, 69d, 69e, and 69f respectively of the recorder 70 to be described in detail hereinafter. The switch arms 44, 57 and 67 are all disposed in the same angular position with reference to the shaft 66 so that the associated contacts marked with the same subscript are synchronously contacted by all three switch arms 44, 57, and 67. Accordingly the contacts or terminals 68a, 68b, 68c, 68d, 68e, and 68f are also arranged along the periphery of a circle in exactly the same manner and order as the contacts or terminals 43 and 58.

Although the wave signal receiver 10 has been illustrated as one for receiving signals from transmitting stations broadcasting within the standard A. M. broadcast band it will be understood that it might equally well be a frequency modulation receiver or at least be provided with a frequency modulation channel. In order that information with respect to the tuning of a wave signal receiver to stations transmitting frequency modulation signals may be recorded, it will be understood that the search signal produced by the search signal generator 35 should be frequency modulated. This can be accomplished by replacing the illustrated crystal controlled oscillator by a stepwise tuned oscillator which is frequency modulated by a 5 kc. signal in conventional manner. If desired separate oscillators for the frequency modulation spectrum may be provided such as is disclosed in co-pending Scherbatskoy application Serial No. 781,989, filed concurrently herewith and assigned to the same assignee as the pressent application.

In view of the fact that the search signal generator 35 produces a search signal varying in frequency in a stepwise manner, each frequency step differing by exactly 5 kc. from the frequency of an associated transmitter, it will be apparent that a 5 kc. heterodyne note will be produced in the receiver when it is tuned to a particular transmitting station, which note will occur at the instant that the frequency step of the search signal which differs from the tuned in station frequency by 5 kc. is generated. This 5 kc. response is an audible response and by virtue of being a monochromatic or single frequency component signal it may be filtered with a narrow band pass filter and transmitted so as to produce a suitable response in the recording apparatus at the central station 15. It will be apparent that with this arrangement a response is produced without the necessity of a separate oscillator for modulating the search signal as is required with the prior art arrangements.

It will be understood that any other type of search signal generator may be employed so long as it is capable of producing during a scanning or search cycle a signal composed of a plurality of successively changing discrete frequencies arranged in stepwise fashion, the frequency of each step differing by exactly 5 kc. from the transmitting frequency of a different transmitting station which might be tuned in by the wave signal receiver 10. It should furthermore be understood that although a frequency difference of 5 kc. is desirable since it reduces the number of crystals of different frequencies required for the crystal oscillators for monitoring a large number of receivers, a frequency difference other than 5 kc. such for example as 6 kc. may also be employed. The frequency difference should be of such a magnitude that at that frequency both the radio receiver 10 and particularly the signal reproducer thereof as well as the human ear are relatively insensitive.

As illustrated in the drawings the central station 15 is continually energized from the house wiring circuit 14 through the power supply unit 51. It will be understood that in accordance with the disclosure in the above mentioned Scherbatskoy application Serial No. 781,989 that the power supply unit 51 may be energized to supply power to the various parts of the central station 15 only when the wave signal receiver 10 is turned on. As illustrated the power supply unit designated as 74 for the receiver attachment 13 is not energized unless the wave signal receiver 10 is turned on. Preferably this power supply unit 74 is connected through the contacts 75a of a relay 75 and the plug connector 22 to the house wiring circuit 14. The winding of the relay 75 is connected in series with the power supply through the manually actuable switch 24 of the receiver 10. Whenever the receiver is turned on through closing of the switch 24 current flows to the receiver power supply unit 20 which is of sufficient magnitude to cause the relay 75 to close its contacts 75a with the result that the receiver attachment power supply unit 74 is energized.

For the purpose of picking up a signal indicative of the response produced in the wave signal receiver 10 by the search signal created by the search signal generator 35 there is provided in the receiver attachment 13 a 5 kc. band pass filter 77 which is preferably a sharply tuned filter so as to pass substantially only signals having a frequency of 5 kc. The input of the 5 kc. band pass filter 77 is preferably connected to a microphone or the like positioned adjacent the signal reproducer or loud speaker 12 or as illustrated the 5 kc. band pass filter may be connected by the conductor 17 with the terminal 33a at the so-called "top of the volume control" of the wave signal receiver 10. Such a connection can readily be made without disturbing the high frequency circuits or even the audio circuits of the radio receiver 10. The alternative arrangement suggested above employing a microphone are shown in the co-pending Scherbatskoy application Serial No. 781,988 referred to above, and with this arrangement no connection whatever with the wave signal receiver 10 is required.

As illustrated in the drawings the output of the 5 kc. band pass filter 77 is supplied to an amplifier 78, the output of which is connected by means of a coupling capacitor 79 with the house wiring circuit 14 through the contacts 75a and the plug connector 22 so that a signal representative of the 5 kc. response may be supplied to the central station 15 so as to be recorded by the recorder 70. It will be understood that this connection of the amplifier 78 with the house wiring circuit 14 through the coupling capacitor 79 should preferably be to the ungrounded side with reference to high frequency grounding thereof.

In order that a record of the search tone produced in the wave signal receiver 10 may be made by the recorder 70 the central station 15 is provided with a 5 kc. control channel comprising a 5 kc. band pass filter 80, an amplifier 81, a rectifier 82, and a relay 83. The 5 kc. band pass filter 80 is connected to the particular line of the house wiring circuit 14 (to which the output of the amplifier 78 is coupled) so as to be capable of picking up the 5 kc. signal representative of the search tone produced in the wave signal receiver 10. This signal is amplified by the amplifier 81 and rectified by the rectifier 82 so as to control the energization of a relay 83 which might be designated as a stylus control relay 83. This stylus control relay 83 is provided with a pair of normally closed contacts 83a and a pair of normally open contacts 83b. Only when a 5 kc. signal is supplied to the 5 kc. band pass filter 80, is the relay 83 energized to open its normally closed contacts 83a and close its normally open contacts 83b. As illustrated the normally open contacts 83b control the supply of +B potential to the stylus control switch comprising the movable arm 67. Also as illustrated the contacts 83b are connected to the source of +B potential at the power supply unit 51 through a suitable conductor 88. The other contact of the pair of normally open contacts 83b is connected through a voltage dropping resistor 89 and a conductor 90 with the rotatable switch arm 67. With this arrangement it is apparent that at the instant during the scanning cycle that the relay 83 is energized, +B potential is supplied to the switch arm 67 to produce a control operation in the recorder 70 to be described hereinafter.

For the purpose of producing an appropriate record indicative of the tuning condition of the wave signal receiver 10 there is provided a recorder 70 referred to above and indicated as comprising seven styli, 69a to 69g inclusive. It should be understood that the particular type of recorder employed is immaterial as far as the present invention is concerned and the particular recorder illustrated in the drawings is by way of example only. As illustrated the recorder 70 includes a movable recording element 92, continuous movement of which in the direction of the arrow is caused by rotation of a sprocket 93. The recording element 92 is specifically illustrated as a tape having perforations along the edges for engagement with the teeth of the sprocket 93. Preferably the sprocket 93 is driven by a synchronous motor and gear train unit 94 connected to a suitable source of power such as the house wiring circuit 14 by means of the conductors 95. It will be understood that the synchronous motor and gear train unit 94 should be continuously energized regardless of whether the other parts of the central station 15 are continuously energized. The recorder 70 further includes a suitable take up spool 96 and a tape supply spool not shown. As illustrated the recording element or tape 92 is a chemically responsive element such as for example an electrolytic paper. When an electric current is passed through such an element a chemical action occurs which produces a trace on the element or tape at the point of current flow. To this end the recording element or tape 92 is caused to pass over a conducting shoe 97 which is grounded as indicated at 98. Whenever a potential such as a +B potential from the conductor 90 is applied to one of the styli such as 69a to 69f current flows through the tape 92 and the resultant current flow causes a trace to be reproduced on the recording element 92 beneath the contacting portion of the particular stylus 69 which is energized since this contacting portion is directly over the grounded conducting shoe 97. Due to the positioning of the styli 69 transversely of the tape 92, the transverse position relative to the tape of the traces produced by the styli is indicative of the stations to which the wave signal receiver 10 is tuned.

In view of the fact that the styli 69a to 69f inclusive are connected to various terminals 68a to 68f respectively of the stylus selecting switch comprising the rotatable arm 67 it will be apparent that a trace will be produced on the recording element 92 by whichever stylus is energized when a search tone occurs in the receiver 10 during the scanning cycle of the search signal generator 35 with the resultant energization of the stylus control relay 83 to close its contacts 83b. It will furthermore be apparent that each of the styli 69a to 69f corresponds to a particular frequency step in the search signal whose frequency varies in a stepwise fashion during each cycle of the search signal generator and consequently corresponds to a particular transmitter tuned in by the wave signal receiver 10. If for example the wave signal receiver 10 is tuned to a transmitter having a frequency which differs from the natural frequency of the crystal 42a by exactly 5 kc. then it will be apparent that a search tone will occur in the wave signal receiver 10 whenever the rotatable switch arms 44, 57 and 67 engage their associated contacts marked with a subscript a. This search tone will cause the stylus control relay 83 to close its contacts 83b in the manner described above at the instant that the switch arms 44, 57, and 67 engage their associated contacts marked with a subscript a. At this instant +B potential is supplied, through the conductor 71a to the stylus 69a whereupon the stylus 69a produces a trace on the recording element 92. It will be apparent that this trace will be produced successively with continuous rotation of the synchronous motor 62 at the same instant during each scanning cycle of preferably one minute duration, as long as the wave signal receiver 10 remains tuned to this particular transmitting station. It will be understood that if the wave signal receiver 10 were tuned to some other station corresponding to some other of the crystals 42 a different one of the styli 69 would produce the trace on the recording element 92. Consequently a trace in the form of a dashed or dotted line will be produced and the position transversely of the recording element 92 will be indicative of the particular transmitting station to which the wave signal receiver 10 is tuned.

As a practical matter there is a limit to the number of styli 69 likely to be provided in a recorder such as 70. Generally the number of styli provided would correspond to the number of stations which are likely to be tuned in often by the wave signal receiver 10. Occasionally, however, the wave signal receiver 10 will be tuned to stations other than those for which specific styli 69 are provided. Information relative to the tuning of the wave signal receiver 10 to stations other than those for which the styli 69a to 69f are provided is often very valuable to the analysis organization obtaining information relative to the listening habits of wave signal receiver users. Accordingly the stylus 69g is provided in the recorder 70 which stylus may be referred to as "all other stations" stylus. As is apparent from the drawings the "all other stations" stylus 69g is normally energized from a source of +B potential through the conductor 88, the contacts 83a of the relay 83 and the voltage dropping resistor 100. The "all other stations" stylus 69g is deenergized whenever the relay 83 is energized. If the central station 15 and specifically the power supply unit 51 thereof is only energized when the wave signal receiver 10 is turned on, then the "all other stations" stylus 69g will produce a trace whenever the wave signal receiver 10 is turned on. If no other trace is produced by one of the other styli 69 then it is apparent that the wave signal receiver 10 is tuned to "all other stations." It will be apparent that if the stylus 69g indicates that the wave signal receiver 10 is tuned to "all other stations" for substantial periods of time that it is evident that the search signal generator 35 should be provided with means for producing additional or other steps in the search signal whose frequency varies in a stepwise manner.

In view of the detailed description included above the operation of the "side frequency" search signal type of device will be apparent to those skilled in the art. When the receiver 10 is turned off no power is supplied to the receiver attachment 13 and preferably the power supply unit 51 is also deenergized. The synchronous motor and gear train unit 94, however, is continuously energized to drive the recording element 92 at a constant speed or in some other predetermined manner with respect to time. Whenever the receiver 10 is turned on through manipulation of the switch 24 power is supplied to the power supply unit 74 of the receiver attachment 13, and preferably through suitable remote control means or the like not shown, the power supply unit 51 is also energized with the result that the synchronous motor 62 causes rotation of the switch arms 44, 57, and 67 at one R. P. M. and +B potential is supplied to the search signal generator 35 and to the "all other stations" stylus 69g. The resultant search signal produced during each scanning cycle, preferably of one minute duration, varies in frequency in a stepwise fashion each step having a frequency differing by exactly 5 kc. from the transmitting frequency of an associated transmitting station to which the wave signal receiver 10 is likely to be tuned. When the wave signal receiver 10 is tuned to a particular one of these transmitting stations having a frequency differing by 5 kc. with one of the frequency steps of the search signal a search tone having a frequency of 5 kc. is produced at the instant that the search signal has the frequency of the particular step under consideration. It will be apparent that no variable and annoying heterodyne squeal can be produced since the frequencies differ from each other by an exact frequency of 5 kc. and there is no variable frequency difference which would produce any lower frequency disturbing components. The search tone produced in the receiver 10 is filtered and amplified by the receiver attachment 13 and again filtered and amplified in the central station 15 so that the relay 83 operates substantially only when the 5 kc. response occurs in the receiver to produce the desired trace on the recording element 92. The position of the traces which are produced by the styli 69 transversely of the recording element 92 is indicative of the particular station tuned in by the wave signal receiver 10.

Although the arrangement described above contemplates a continuous scanning operation of the search signal generator, it is sometimes desirable to have the search signal generator operate only when the tuning of the wave signal receiver 10 is changed. It should be understood that the present invention is equally applicable for use with the lock out and recycling arrangement disclosed and claimed in the co-pending Freeman and Scherbatskoy application Serial No. 781,990, filed October 24, 1947, and assigned to the same assignee as the present application.

With the present invention the requirement of a separate oscillator for producing modulations of the search signal capable of producing a response in the receiver 10 is eliminated and a somewhat simpler apparatus is provided.

Furthermore because the frequency of the crystal controlled search signal oscillator differs by 5 kc., one oscillator frequency may be used to log two stations and consequently the number of crystals may be reduced.

Although the present invention has been specifically described in connection with an arrangement whereby the search signal varies discontinuously in frequency so as to comprise a plurality of discrete frequency steps it should be understood that it might also be employed in connection with an arrangement wherein the search signal varies continuously in frequency as is disclosed in the above mentioned copending Scherbatskoy application, Serial No. 781,988. With a search signal which varies continuously in frequency a heterodyne squeal is produced as the frequency of the search signal approaches that of the transmitter tuned in by the receiver being metered or monitored. Suitable filter means may be provided to permit only the 5 kc. note or a similar single frequency component of this squeal to produce a response in the receiver which is capable of being transmitted by the receiver attachment 13 to the central station 15. If the intensity of the search signal is made sufficiently low so that the heterodyne squeal is substantially inaudible such squeal will not be disturbing to the listener. With sufficient amplification and filtering on the other hand a record of the response transmitted to the central station can be made. In any event a recordable response is produced without the requirement of a modulation component superimposed on the search signal regardless of whether the search signal is continuously or discontinuously variable.

In Fig. 3 of the drawings there is disclosed a modification of the present invention in which the search signal varies continuously in frequency and wherein means are provided to effectively eliminate the disturbing heterodyne squeal which occurs as the frequency of the search signal approaches and passes through the frequency of the carrier tuned in by the wave signal receiver being metered or monitored. The corresponding parts of Fig. 3 are designated by the same reference numerals as in the preceding figures. The central station is designated as 15' to distinguish from the central station 15 of the preceding figures. The central station 15' differs from the central station 15 substantially only with respect to the search signal generator designated at 105 and the recording apparatus generally designated at 106.

As illustrated the search signal generator comprises an oscillator of any suitable form specifically illustrated as an electron coupled oscillator comprising the pentode 36 which is identical with the pentode employed in the search signal generator 35 described above. The plate circuit of the pentode 36 is connected to a source of +B potential from the power supply unit 51 through a radio frequency choke coil 107. This plate circuit is also coupled to the antenna 16 by a suitable coupling capacitor 61. For the purpose of producing the variable frequency search signal a tank circuit is provided comprising a parallel arranged inductance 108 and a variable capacitor 109. As illustrated the capacitance of the capacitor 109 is continuously varied by having the rotor thereof drivingly connected to the shaft 66 of the synchronous motor unit 62. The arrangement is preferably such that the rotor plates of the capacitor 109 are rotated at one revolution per minute. It will be understood that the capacitor 109 should be one in which the change of frequency with rotation of the rotor plates is a linear change. One terminal of the tank circuit is grounded as indicated at 110. The other terminal of the tank circuit is connected to the control electrode 39 through a suitable coupling capacitor 111. The cathode 38 is connected to an intermediate point 108a on the inductance 108 of the tank circuit. A grid leak resistor 112 is connected across the grid to cathode circuit and the magnitude of the resistance of this resistor and the cathode connection to the inductance 108 are adjusted for proper oscillator action. The screen grid 40 is connected to the source of +B potential through a suitable voltage dropping resistor 53 and a radio frequency by-pass to ground is supplied by the capacitor 55. The suppressor grid 41 is grounded as indicated. With this arrangement it will be apparent that continuous operation of the synchronous motor 62 will cause the search signal generator 105 to apply a search signal having a continuously variable frequency to the transmitting antenna 16, in the same manner that the search signal generator 35 causes a search signal having a discontinuously variable frequency to be applied to the transmitting antenna 16.

The recorder 106 differs somewhat from the recorder 70 described above, although corresponding parts thereof are designated by the same reference numerals. It should be understood that the recorder 106 like the recorder 70 is illustrated by way of example only and any other suitable recording device might equally well be employed. As illustrated this recorder comprises a movable recording element 115 which is illustrated as a tape having sprocket holes adatped to be engaged by a suitable sprocket 93 driven by a synchronous motor and gear train unit 94 through a shaft 116. The synchronous motor unit 94 is preferably energized from the house wiring circuit 14 so as to be energized continuously regardless of whether the remainder of the apparatus at the central station 15' is energized or not, thereby insuring continuous movement or at least movement in a predetermined manner of the recording element 115. The recorder 106 includes the tape supply spool 117 and the take up spool 96 together with suitable means for maintaining the tape in a taut condition.

The means for producing a record on the recording element 115 is illustrated in Fig. 3 as comprising a stylus 118 which is supported for arcuate movement on a pivot 119 so that the inscribing portion 118a thereof is adapted to move transversely of the tape or recording element 115. The stylus 118 is connected by a suitable link 120 and a crank 121 with the shaft 66 of the synchronous motor 62. It will be apparent that with this arrangement the position transversely of the recording element 115 of the inscribing portion 118a of the stylus 118 will correspond to a particular position of the rotor plates of the variable condenser 109 or in other words to a particular frequency of the search signal produced by the generator 105.

For the purpose of producing the desired trace on the recording element 115 the stylus pivot 119 is supported from a movable carriage 122 mounted for limited movement about a pivot 123. A suitable spring 124 biases the carriage 122 in such a manner that the inscribing point 118a of the stylus 118 is normally not in trace producing engagement with the recording element 115. A portion of the carriage 122 forms the armature of the electromagnet comprising a coil 125 which is connected to the output of the rectifier 82 as by means of the conductors 126. Whenever the search signal generator produces a signal the frequency of which differs by 5 kc. from the frequency of the transmitting station tuned in by the wave signal receiver 10 a response is produced in the receiver 10 which is transmittable to the central station 15' and in fact causes energization of the winding 125 with the result that the inscribing portion 118a engages the recording element 115 to produce a trace, the transverse position of which is indicative of the station to which the wave signal receiver 10 is tuned.

In order to eliminate any disturbing audible heterodyne squeal which might occur, due to intermodulation of the continuously variable frequency search signal and the station carrier tuned by the wave signal receiver 10, following the occurrence of the 5 kc. response, there is provided in accordance with the present invention a relay generally designated at 127. This relay includes a winding 127a which is connected in series with the winding or coil 125 so that the occurrence of a response in the receiver 10 which is transmittable to the central station 15' to cause energization of the winding 125 also causes energization of the relay 127. The relay 127 includes a set of normally open contacts 127b. As illustrated the contacts 127b are adapted, by means of a conductor 128 to complete a circuit for grounding the control electrode 39 of the pentode 36 upon energization of the winding 127a. Such grounding of the control electrode 39 interrupts the operation of the search signal generator 105 as far as the output thereof is concerned and this interruption occurs just at the instant when the disturbing audible heterodyne squeal would normally occur thus eliminating such squeal. As illustrated the relay 127 is a time delay drop out relay. The time delay feature is diagrammatically illustrated by a dash pot 127c producing a time delay with reference to the operation of the relay 127 in the direction of the arrow, but no time delay for the other direction of movement of the relay 127. This time delay is adjusted by suitable means such as a needle valve 127d whereby it is possible to adjust the operation so as to prevent an output from the search signal generator 105 until sufficient rotation of the rotor plates of the capacitor 109 has occurred so that upon opening of the contacts 127b no further audible heterodyne squeal will occur during the remainder of that cycle of the search signal generator. It will furthermore be apparent that during each succeeding cycle the operation of the relay 127 will prevent the occurrence of such heterodyne squeal, immediately following the receipt of the 5 kc. response thus further illustrating that the present invention is equally applicable whether the search signal is continuously or discontinuously variable without the requirement of a modulation component being superimposed on the search signal.

It will also be understood that for either a continuously or a discontinuously variable search signal, suitable lock out means such as are disclosed and claimed in the copending Scherbatskoy and Freeman application, Serial No. 781,990, filed October 24, 1947, may be employed to eliminate any disturbing response for all but short instants of time when the tuning is changed.

It will be apparent to those skilled in the art that the present invention is not limited to the particular constructions and arrangements shown and described but that changes and modifications may be made without departing from the spirit and scope of the invention, and it is aimed in the appended claims to cover all such changes and modifications.

What is claimed as new and desired to be secure by Letters Patent of the United States is:

1. In a device for determining the listening habits of users of a wave signal receiver comprising an oscillator for cyclically generating a search signal receivable by said receiver, means for controlling said oscillator so that each cycle of said search signal comprises a signal variable in frequency in a stepwise fashion, each step differing by the same predetermined frequency from one of a plurality of different transmitting frequencies likely to be tuned in by said wave signal receiver, whereby a response in the form of a signal of the frequency of said predetermined frequency is produced in said receiver at the instant during the search cycle that the frequency step of said search signal differs by said predetermined frequency from the frequency of the transmitter tuned in by said receiver, means for filtering and amplifying said response, and means for recording said amplified response with reference to time whereby a record of the tuning condition of said receiver is obtained.

2. A device for producing a record of the tuning condition of a wave signal receiver comprising a crystal oscillator for cyclically generating a search signal receivable by said receiver, means for controlling said oscillator so that each cycle of said search signal comprises a signal variable in frequency in a stepwise fashion, each step bearing a predetermined relationship to one of a plurality of different transmitting frequencies likely to be tuned in by said wave signal receiver, said search signal producing a response in the form of a signal of a predetermined frequency in said receiver at the instant during the search cycle that a frequency step of said search signal bears said predetermined relationship to the frequency of a transmitter tuned in by said receiver, means at said receiver for filtering and amplifying said response, means for transmitting said response to a point remote from said receiver, and means at said remote point for further amplifying said response and recording the same with reference to time whereby a record of the tuning condition of said receiver is obtained.

3. Apparatus for producing a continuous record of the tuning condition of a wave signal receiver, comprising a crystal oscillator including a plurality of crystals each having a natural frequency differing by 5 kc. from the transmitting frequencies of a plurality of transmitting stations to which said receiver may be tuned for signal reception, means for successively rendering said crystals effective one at a time in a cyclic manner so as to produce an oscillator output in the form of a search signal variable in frequency in a stepwise fashion during each cycle, means for transmitting said search signal so as to be receivable by said receiver and modulated with the signal from a transmitting station tuned in by said receiver, whereby a 5 kc. response is produced in said receiver at the instant during said cycle that the crystal whose frequency differs by 5 kc. from the transmitting frequency of the station tuned in by said receiver is effective to control the output frequency of said oscillator, means for filtering and amplifying said response, and means for recording said response with reference to the instant of occurrence thereof during said cycle as well as with reference to time so that a record of the tuning condition of said receiver is obtained.

4. In a device for determining the listening habits of users of a wave signal receiver tunable to receive the radiated carriers from a plurality of transmitters, generating means for producing an unmodulated search signal other than the output of any of said transmitters, said search signal being variable in frequency in a stepwise fashion each frequency step being representative of one of said transmitters and differing in frequency from the frequency of the radiated carrier of the transmitter of which it is representative by a predetermined frequency which difference frequency is the same for each step with respect to the radiated carrier which it represents, and means for transmitting said search signal to said receiver for reception thereof simultaneously with the reception of one of said radiated carriers, the intermodulation of said search signal with any one of said radiated carriers received by said receiver producing a heterodyne note in said receiver of said predetermined frequency upon the production of the frequency step of said search signal representative of the transmitter producing the particular radiated carrier received by said receiver.

5. In a device for determining the listening habits of users of a wave signal receiver tunable to receive the radiated carriers from a plurality of transmitters, generating means for producing an unmodulated search signal other than the output of any of said transmitters, said search signal being variable in frequency in a stepwise fashion each frequency step being representative of one of said transmitters and differing in frequency from the frequency of the radiated carrier of the transmitter of which it is representative by a predetermined frequency which difference frequency is the same for each step with respect to the radiated carrier which it represents, means for transmitting said search signal to said receiver for reception thereof simultaneously with the reception of one of said radiated carriers, the intermodulation of said search signal with any one of said radiated carriers received by said receiver producing a heterodyne note in said receiver of said predetermined frequency upon the production of the frequency step of said search signal representative of the particular transmitter producing the radiated carrier received by said receiver, and means for producing an indication of said heterodyne note of predetermined frequency with reference to the instant of occurrence.

6. In combination with a wave signal receiver which is tunable over a fequency range to receive signals from different transmitting stations operating at different frequencies within said range, search signal generating means for generating a search signal, means for controlling said search signal generating means so that said search signal is varied in frequency over said tuning range of said receiver and at one frequency thereof is thus receivable by said receiver along with the signal radiated from one of said transmitting stations, means for transmitting said search signal to said receiver to cause intermodulation of said search signal with the signal being received by said receiver from said one transmitting station when said one frequency of said search signal is attained, thereby to produce a beat frequency signal in said receiver, and means linked to said receiver and responsive to the occurrence of said beat frequency signal for producing an indication of the transmitting station to which said receiver is tuned for signal reception.

7. In combination with a wave signal receiver which is tunable over a frequency range to receive signals from different transmitting stations operating at different frequencies within said range, search signal generating means for generating a search signal, means for controlling said search signal generating means so that said search signal is continuously varied in frequency over the tuning range of said receiver and at one frequency thereof is thus receivable by said receiver along with the signal radiated from one of said transmitting stations, means for transmitting said signal to said receiver to cause intermodulation of said search signal with the signal being received by said receiver from said one transmitting station when said one frequency of said search signal is attained, thereby to produce a beat frequency signal in said receiver, means linked to said receiver and responsive to the occurrence of said beat frequency signal for producing an indication of the transmitting station to which said receiver is tuned for signal reception, and means responsive to the occurrence of said beat frequency signal for rendering said search signal generating means ineffective for a short increment of time following the occurrence of said beat frequency signal, thereby to prevent the production of a variable pitch audible heterodyne note.

8. In combination with a wave signal receiver which is tunable over a frequency range to receive signals from different transmitting stations operating at different frequencies within said range, cyclically operating search signal generating means for generating an unmodulated search signal, means for controlling said search signal generating means so that during each operating cycle thereof the search signal frequency is varied over the tuning range of said receiver and at one frequency thereof is thus receivable by said receiver along with the signal radiated from one of said transmitting stations, means for transmitting said signal to said receiver to cause intermodulation of said search signal with the signal being received by said receiver from said one transmitting station when said one frequency of said search signal is attained, thereby to produce a beat frequency signal in said receiver, means linked to said receiver and responsive to the occurrence of said beat frequency signal for producing an indication of the transmitting station to which said receiver is tuned for signal reception, and means responsive to the occurrence of said beat frequency signal for rendering said search signal generating means ineffective for a short increment of time during each cycle following the occurrence of said beat frequency signal, thereby to prevent the production of a variable pitch audible heterodyne note in said receiver.

9. In combination with a wave signal receiver which is tunable over a frequency range to receive signals from different transmitting stations operating at different frequencies within said range, search signal generating means for generating a search signal variable in frequency over said range, means for transmitting said search signal to said receiver for reception by said receiver along with the signal radiated from one of said transmitting stations, whereby a beat frequency signal is produced in said receiver when the frequency of said search signal bears a predetermined relationship to the frequency of the signal being received by said receiver from said one transmitting station, means linked to said receiver and responsive to the production of said beat frequency signal for producing an indication of the transmitting station to which said receiver is tuned for signal reception and means responsive to the initial production of said beat frequency signal for eliminating the variable pitch audible beat note which would otherwise immediately follow said beat frequency response.

JOSEPH M. RICHARDS.

References Cited in the file of this patent

UNITED STATES PATENTS

| Number | Name | Date |
| --- | --- | --- |
| 1,993,395 | Beers | Mar. 5, 1935 |
| 2,093,855 | Taylor | Sept. 21, 1937 |
| 2,112,446 | Pelmulder et al. | Mar. 29, 1938 |
| 2,157,576 | Schneider | May 9, 1939 |
| 2,213,886 | Potter | Sept. 3, 1940 |
| 2,275,460 | Page | Mar. 10, 1942 |
| 2,354,836 | Rusch | Aug. 1, 1944 |
| 2,383,322 | Koch | Aug. 21, 1945 |
| 2,416,336 | Marchand | Feb. 25, 1947 |
| 2,421,106 | Wight | May 27, 1947 |